US011927147B2

(12) United States Patent
Yato

(10) Patent No.: US 11,927,147 B2
(45) Date of Patent: Mar. 12, 2024

(54) PUMP UNIT

(71) Applicant: AISAN KOGYO KABUSHIKI KAISHA, Obu (JP)

(72) Inventor: Yukihiko Yato, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/641,640

(22) PCT Filed: Jul. 27, 2020

(86) PCT No.: PCT/JP2020/028762
§ 371 (c)(1),
(2) Date: Mar. 9, 2022

(87) PCT Pub. No.: WO2021/059722
PCT Pub. Date: Apr. 1, 2021

(65) Prior Publication Data

US 2022/0349360 A1 Nov. 3, 2022

(30) Foreign Application Priority Data

Sep. 24, 2019 (JP) ................................ 2019-172989

(51) Int. Cl.
*F02D 41/00* (2006.01)
*F02D 41/30* (2006.01)

(52) U.S. Cl.
CPC .. *F02D 41/3082* (2013.01); *F02D 2200/0602* (2013.01); *F02D 2200/0606* (2013.01); *F02D 2200/50* (2013.01)

(58) Field of Classification Search
CPC ......... F02D 41/3082; F02D 2200/0602; F02D 2200/0606; F02D 2200/50; F02D 33/006; F02M 37/40; F02M 37/08
See application file for complete search history.

(56) References Cited

U.S. PATENT DOCUMENTS 5,085,198 A * 2/1992 Bartlett .................. F02M 53/02 123/514
7,775,191 B2 * 8/2010 Hou .................... F02D 41/3836 123/514

(Continued)

FOREIGN PATENT DOCUMENTS

JP H10-047255 A 2/1998
JP H10-153150 A 6/1998

(Continued)

OTHER PUBLICATIONS

Written Opinion (WO) for PCT/JP2020/028762 dated Oct. 6, 2020 (4 pages).
Japanese Office Action (JP OA) for JP Pat. App. No. 2021-548386 dated Nov. 1, 2022.
International Search Report (ISR) for PCT/JP2020/028762 dated Oct. 6, 2020 (5 pages).
Japanese Office Action (JP OA) for JP Pat. App. No. 2021-548386 dated Feb. 21. 2023.

*Primary Examiner* — Phutthiwat Wongwian
*Assistant Examiner* — Sherman D Manley
(74) *Attorney, Agent, or Firm* — Shumaker, Loop & Kendrick, LLP

(57) ABSTRACT

A pump unit may include a pump configured to increase a pressure of diesel fuel and discharge the diesel fuel to a fuel passage in which a filter is disposed, and a controller configured to control an operation of the pump. The controller may be configured to execute freeze avoidance control in which the operation of the pump is controlled using an index that indicates a degree of clogging of the filter caused by the diesel fuel freezing. In the freeze avoidance control, the controller may be configured to apply a higher load to the pump as the degree of clogging of the filter indicated by the index is higher.

5 Claims, 8 Drawing Sheets

(56) References Cited

U.S. PATENT DOCUMENTS

| | | | | |
|---|---|---|---|---|
| 7,827,966 | B2 * | 11/2010 | Narisako | F02M 37/0047 123/514 |
| 8,413,636 | B2 * | 4/2013 | Suzuki | F02M 55/025 123/457 |
| 8,707,932 | B1 * | 4/2014 | Marin | F02D 41/1401 123/497 |
| 9,228,655 | B2 | 1/2016 | Wakairo et al. | |
| 2007/0283929 | A1 * | 12/2007 | Funabashi | F02M 59/34 123/446 |
| 2008/0072619 | A1 | 3/2008 | Nojima et al. | |
| 2011/0023833 | A1 * | 2/2011 | Chamarthi | F02M 53/00 123/464 |
| 2014/0230791 | A1 | 8/2014 | Kojima et al. | |
| 2014/0295307 | A1 * | 10/2014 | Toida | B60L 3/0053 429/432 |
| 2015/0252764 | A1 | 9/2015 | Cho et al. | |

FOREIGN PATENT DOCUMENTS

| | | | |
|---|---|---|---|
| JP | 2002-071228 | A | 3/2002 |
| JP | 2005273535 | A | 10/2005 |
| JP | 2008-104337 | A | 5/2008 |
| JP | 2013-0638195 | A | 4/2013 |
| JP | 2014-095349 | A | 5/2014 |
| JP | 2014-1530289 | A | 10/2014 |
| WO | 2010/109579 | A1 | 9/2010 |
| WO | 2013/046359 | A1 | 4/2013 |

* cited by examiner

FIG. 3

400

| Voltage (V) | E1 | E2 |
|---|---|---|
| Standard Duty (%) | D1 | D2 |

FIG. 4

410

| Pressure (kPa) \ Fuel Temperature (°C) | T1 | ··· | T2 | ··· | T3 |
|---|---|---|---|---|---|
| P1 | 0 | ··· | 0 | ··· | 0 |
| ⋮ | ⋮ | ⋮ | ⋮ | ⋮ | ⋮ |
| P2 | +d1 | ··· | +d2 | ··· | 0 |

FIG. 10

500

| Voltage (V) / Pressure (kPa) | E1 | E1 |
| --- | --- | --- |
| P1 | D3 | D4 |
| ⋮ | ⋮ | ⋮ |
| P2 | D5 | D6 |

PUMP UNIT

TECHNICAL FIELD

The present specification discloses teachings relating to a pump unit comprising a pump and a controller configured to control the pump.

BACKGROUND ART

Japanese Patent Application Publication No. 2002-71228 describes a refrigeration cycle used for an air conditioner of a vehicle. The refrigeration cycle includes a compressor configured to compress a refrigerant and a control unit configured to control the compressor. The control unit increases a discharge rate of the compressor in a case where a discharge-side passage of the compressor has a high pressure when the compressor is driven.

SUMMARY

In a configuration in which a fluid is compressed by a pump and discharged to a fluid passage, the fluid passage may be clogged. In a device that delivers diesel fuel to an internal combustion engine, the diesel fuel may freeze, for example, when the environmental temperature reaches the freezing point temperature (e.g., −10° C. to −5° C.). In this case, the viscosity of the diesel fuel increases. As a result, the diesel fuel cannot flow through a filter disposed on a discharge-side of the pump, and thus the filter is clogged.

The present specification provides a technique that reduces clogging of a filter disposed on a discharge-side of a pump caused by diesel fuel freezing.

The technique disclosed in the present specification relates to a pump unit for diesel fuel. The pump unit may comprise a pump configured to increase a pressure of diesel fuel and discharge the diesel fuel to a fuel passage in which a filter is disposed; and a controller configured to control an operation of the pump. The controller may be configured to execute freeze avoidance control in which the operation of the pump is controlled using an index that indicates a degree of clogging of the filter caused by the diesel fuel freezing. In the freeze avoidance control, the controller is configured to apply a higher load to the pump as the degree of clogging of the filter indicated by the index is higher.

According to this configuration, the diesel fuel adhering to the filter may be removed by increasing the load on the pump when the degree of clogging of the filter disposed in the fuel passage is presumed to be high. Thus, clogging of the filter may be reduced.

The pump unit may further comprise a pressure acquirer configured to acquire a pressure of the fuel passage between the pump and the filter. The index may include the acquired pressure of the fuel passage. The controller may be configured to apply a higher load to the pump as the pressure of the fuel passage is higher.

The worse clogging of the filter becomes, the higher the pressure of the fuel passage between the pump and the filter becomes. According to the above configuration, the load on the pump may be appropriately controlled by using the pressure of the fuel passage between the pump and the filter as the index indicative of the degree of clogging of the filter.

The controller may be configured to apply a higher load to the pump when the pump is to discharge the diesel fuel before a first predetermined period elapses since the freeze avoidance control was executed than when the pump is to discharge the diesel fuel after the first predetermined period elapses since the freeze avoidance control was executed.

A situation where the freeze avoidance control is executed is where it is presumed that clogging of the filter is occurring. Under this situation, even when the freeze avoidance control is executed, the diesel fuel adhering to the filter may not be removed completely. Especially when a sufficient amount of time has not elapsed since the freeze avoidance control was executed, frozen diesel fuel may not be melted yet, for example, by heat generated by an internal combustion engine. Under such a situation, the configuration above may remove the diesel fuel remaining on the filter by increasing the load on the pump to a higher level than a normal load.

The pump unit may further comprise a temperature acquirer configured to acquire a fuel temperature of the diesel fuel. The controller may be configured to execute the freeze avoidance control when the acquired fuel temperature is lower than a first threshold.

This configuration may avoid executing the freeze avoidance control when the fuel temperature is a temperature at which the diesel fuel is not expected to freeze.

The pump unit may further comprise a temperature acquirer configured to acquire a fuel temperature of the diesel fuel. The index may include the acquired fuel temperature. The controller may be configured to apply a higher load to the pump as the fuel temperature is lower.

The lower the fuel temperature is, the more likely the diesel fuel will be frozen and the degree of clogging of the filter will become worse. According to the above configuration, the load on the pump may be appropriately controlled by using the fuel temperature between the pump and the filter as the index indicative of the degree of clogging of the filter.

The pump unit may further comprise a temperature acquirer configured to acquire a fuel temperature of the diesel fuel. In a case where the acquired fuel temperature is lower than a second threshold when a stop request for stopping the pump is received from outside while the pump is in operation, the controller may be configured to stop the pump after allowing the pump to operate with an increased load for a predetermined period.

In a case where the fuel temperature is low when the stop request for the pump is received from outside, such as from an engine control unit, due to internal combustion engine shutdown, etc., the fuel may freeze after the pump is stopped. According to the above configuration, when the fuel temperature is low, the load on the pump is increased before the pump is stopped. Thus, if frozen diesel fuel is adhering to the filter, it may be removed from the filter. Therefore, clogging of the filter may be prevented after the pump is stopped.

BRIEF DESCRIPTION OF DRAWINGS

FIG. 3 illustrates a table showing relationships between voltages and standard duty cycles;

FIG. 4 illustrates a table showing relationships between fuel temperatures, pressures, and duty cycle correction values;

FIG. 10 illustrates a table showing relationships between voltages, pressures, and drive duty cycles according to the third embodiment.

EMBODIMENT (Configuration of Pump Unit)

Figure 1:
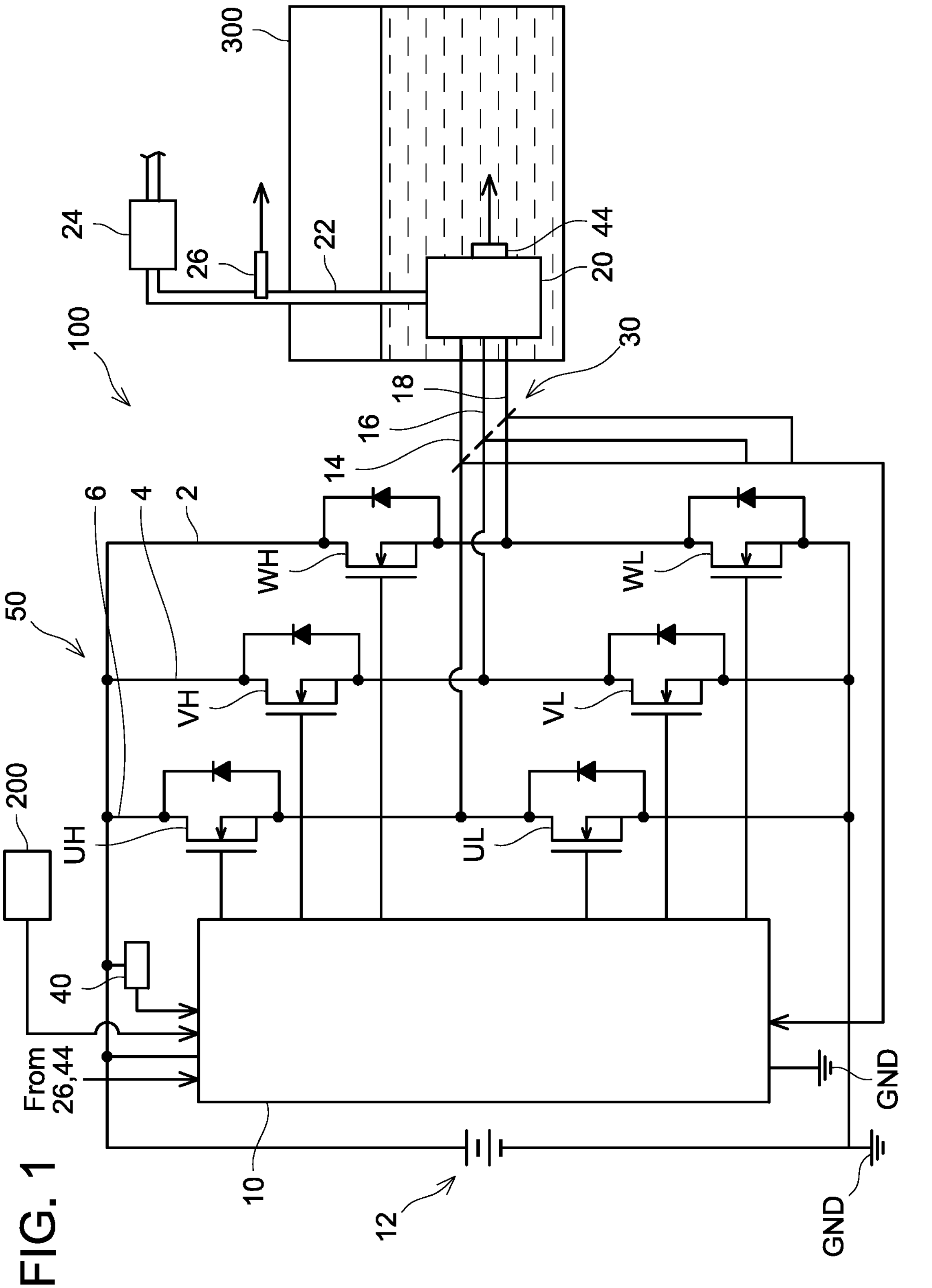
FIG. 1 illustrates a configuration of a pump unit.

Referring to FIG. 1, a pump unit 100 is described. The pump unit 100 is installed in a vehicle equipped with a diesel engine. The pump unit 100 supplies diesel fuel in a fuel tank 300 to the diesel engine, which is not illustrated. The pump unit 100 comprises a pump 20, a controller 10, an inverter 50, a voltage sensor 40, a rotor position detection sensor 30, a pressure sensor 26, and a temperature sensor 44.

The pump 20 is disposed in the fuel tank 300. The pump 20 increases a pressure of the diesel fuel in the fuel tank 300 and discharges it to a fuel passage 22 in which a filter 24 is disposed. The filter 24 removes foreign matters contained in the diesel fuel. The diesel fuel discharged to the fuel passage 22 is supplied to the engine, which is not illustrated. A relief valve (not illustrated) that is in communication with the fuel tank 300 is disposed on the fuel passage 22, so that a pressure of the fuel passage 22 does not become extremely high.

A motor is housed in the pump 20. The motor is a three-phase AC motor and also a brushless motor. Electric power is supplied from a battery 12 installed in the vehicle to the pump 20 via the inverter 50.

The inverter 50 is connected to the motor in the pump 20 and supplies a drive current to the motor. The inverter 50 converts DC power to three-phase AC power. The inverter 50 comprises three switching element pairs (a U-phase switching element pair 6, a V-phase switching element pair 4, a W-phase switching element pair 2) connected in parallel with each other with respect to the battery 12. The switching element pairs 2, 4, 6 each comprise an upper arm element (a transistor UH, VH, WH) that is connected to the high-voltage side of the battery 12 and a lower arm element (a transistor UL, VL, WL) that is connected in series with the upper arm element and also connected to the low-voltage side of the battery 12. The switching element pairs 2, 4, and 6 are connected to the motor in the pump 20 via wires 14, 16, and 18, respectively.

The inverter 50 is connected to the controller 10. The controller 10 controls the pump 20 by controlling the inverter 50 by PWM (pulse width modulation). The controller 10 comprises a CPU, a memory, and a pre-driver. The controller 10 converts DC power from the battery 12 to AC power by switching the transistors (UH, UL, VH, VL, WH, WL) between ON and OFF and supplies it to the motor in the pump 20. The controller 10 is connected to an engine control unit 200 (termed "ECU 200" hereinafter). The controller 10 controls the pump 20 based on control signals received from the ECU 200. A computer program for controlling the pump 20 and various information for executing the program are stored in advance in the controller 10. The computer program stored in the controller 10 includes a computer program for executing processes to be described later.

The controller 10 is connected to the voltage sensor 40, the rotor position detection sensor 30, the pressure sensor 26, and the temperature sensor 44. The voltage sensor 40 detects a voltage of the battery 12. The rotor position detection sensor 30 detects the position of a rotor of the motor in the pump 20. The rotor position detection sensor 30 is connected to the wires 14, 16, 18 and detects the position of the rotor by detecting an induction voltage caused by positional change of the rotor and the stator due to the rotation of the rotor. The pressure sensor 26 detects a pressure of the fuel passage 22 between the pump 20 and the filter 24. The temperature sensor 44 detects a temperature of the diesel fuel in the fuel tank 300. In a variant, the temperature sensor 44 may be disposed at the fuel passage 22 between the fuel tank 300 and the filter 24. In this case, the fuel sensor 44 may detect a temperature of the fuel in the fuel passage 22 between the fuel tank 300 and the filter 24. The controller 10 acquires detection results from the sensors 26, 30, 40, 44.

(Freeze Avoidance Process)

Figure 2:
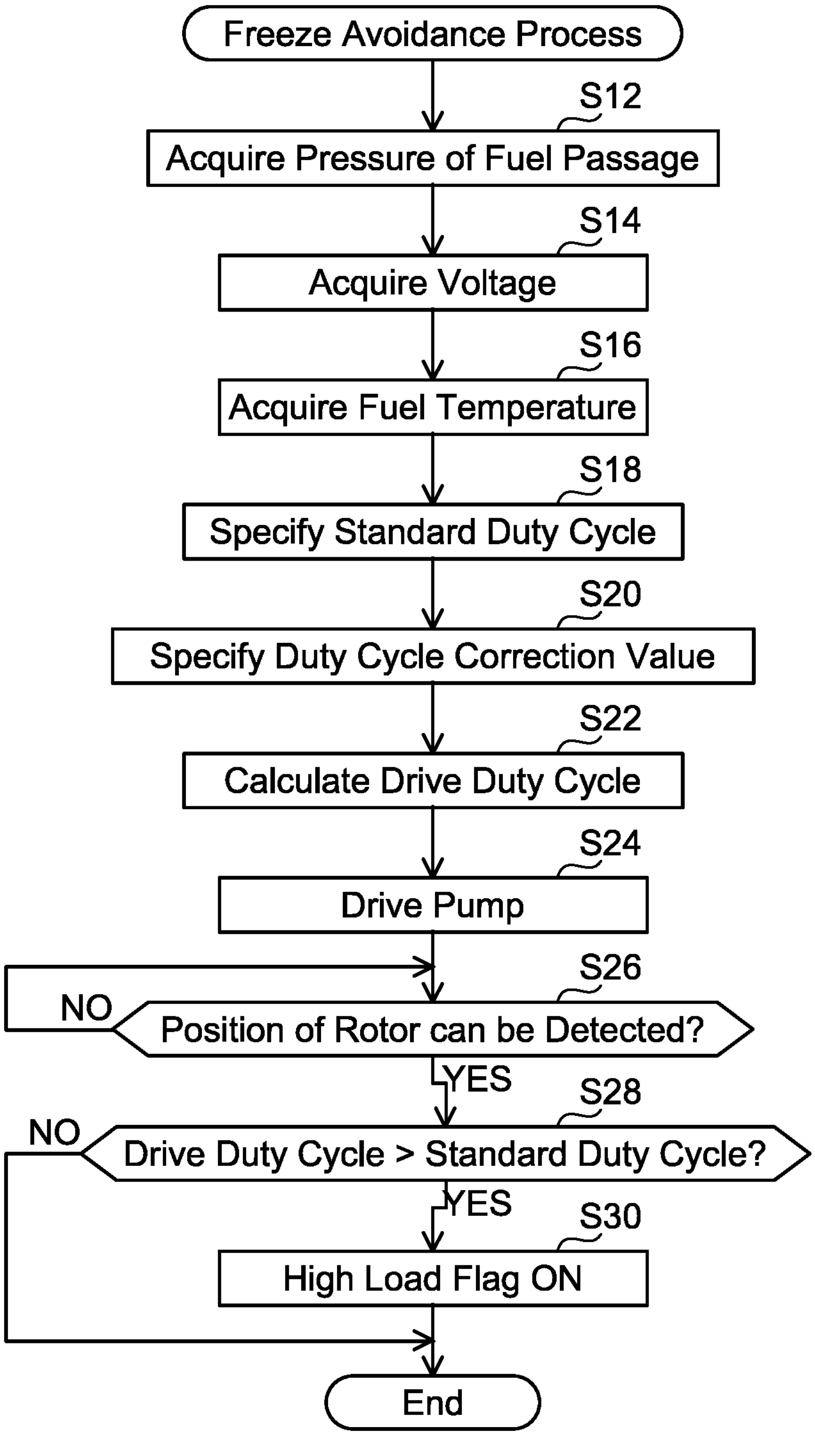
FIG. 2 illustrates a flowchart of a freeze avoidance process according to a first embodiment.

Referring to FIG. 2, a freeze avoidance process executed by the controller 10 is described. For example, in cold climates, the diesel fuel may freeze. When the diesel fuel freezes, viscosity of the diesel fuel increases. As a result, the filter 24 is clogged by the diesel fuel adhering to the filter 24. In the freeze avoidance process, when it is highly probable that the filter 24 is clogged under a situation where the pump 20 is to supply the diesel fuel to the engine, the pump unit 100 executes freeze avoidance control to reduce clogging of the filter 24.

The freeze avoidance process is executed before the pump 20 supplies the diesel fuel to the engine. That is, the pump 20 is not in operation at the start of the freeze avoidance process. When determining that the engine is expected to be started, the ECU 200 sends a signal to the controller 10 to cause it to execute the freeze avoidance process. The ECU 200 determines that the engine is expected to be started, for example, when it is detected that a driver opened a door, when it is detected that a vehicle key was inserted in an ignition switch, when a vehicle sensor detects the vehicle key, etc.

When receiving the signal from the ECU 200, the controller 10 acquires a pressure of the fuel passage 22 between the pump 20 and the filter 24 from the pressure sensor 26 in S12. Then, in S14, the controller 10 acquires a voltage of the battery 12 from the voltage sensor 40. Then, in S16, the controller 10 acquires a temperature of the diesel fuel in the fuel tank 300 from the temperature sensor 44. In S18, the controller 10 specifies a standard duty cycle. Specifically, as illustrated in FIG. 3, the controller 10 stores in advance a table 400 that shows relationships between voltages of the battery 12 and standard duty cycles. The standard duty cycle is a duty cycle to determine electric power to be supplied to the pump 20 in PWM control. The table 400 is stored in advance in the controller 10 by the manufacturer of the vehicle. The voltage of the battery 12 is determined depending on the specifications of the battery installed in the vehicle. A battery of voltage 12 V is usually used in vehicles, while a battery of voltage 24 V or greater can be used in vehicles if the vehicles use a relatively large amount of electric power, for example, in cold climates. In the table 400, standard duty cycles are set corresponding to the voltages of the battery 12 such that a load on the pump 20 does not vary due to the voltage of the battery 12. Thus, in the table 400, a voltage E2 which is larger than a voltage E1 is associated with a standard duty cycle D2 which is smaller than a standard duty cycle D1.

By using the table 400, the controller 10 specifies the standard duty cycle corresponding to the voltage acquired in S14. Then, the controller 10 specifies a duty cycle correction value. Specifically, as illustrated in FIG. 4, the controller 10 stores in advance a table 410 in which duty cycle correction values for correcting standard duty cycles are stored in association with temperatures of the diesel fuel in the fuel tank 300 and pressures of the fuel passage 22 between the pump 20 and the filter 24. The table 410 is stored in advance in the controller 10 by the manufacturer of the vehicle. The fuel temperature varies in accordance with an ambient temperature of the vehicle, a time elapsed since the vehicle was last used, etc. The pressure of the fuel passage 22 between the pump 20 and the filter 24 varies in accordance with a degree of clogging of the filter 24. For example, in a case where the degree of clogging of the filter 24 is low, the fuel of which pressure was increased by the pump 20 flows through the filter 24 when the pump 20 is stopped, and thus the pressure of the fuel passage between the pump 20 and the filter 24 decreases. As the degree of clogging of the filter 24 becomes higher, it becomes more difficult for the fuel of which pressure was increased by the pump 20 to flow through the filter 24 when the pump 20 is stopped. Thus, as the degree of clogging of the filter 24 becomes higher, the pressure of the fuel passage 22 between the pump 20 and the filter 24 becomes higher.

In the table 410, a duty cycle correction value of 0% is stored for a pressure P1 kPa of the fuel passage 22 between the pump 20 and the filter 24, which is the pressure that would be indicated when the filter 24 is free from clogging. Further, the duty cycle correction value of 0% is stored for a temperature T3° C. at which the diesel fuel is not expected to freeze. The duty cycle correction value of 0% is stored for a range of temperatures equal to or higher than a threshold TZ0° C. at which the freezing is not expected, regardless of the pressure of the fuel passage 22 between the pump 20 and the filter 24. As the pressure of the fuel passage 22 between the pump 20 and the filter 24 becomes higher from P1 kPa to a pressure P2 kPa, the duty cycle correction value becomes larger. Further, as the fuel temperature becomes lower, the duty cycle correction value becomes larger. That is, d1 is larger than d2. The table 410 is determined based on experiments or simulations conducted by the manufacturer of the vehicle, etc.

The controller 10 specifies, from the table 410, the duty cycle correction value associated with the pressure acquired in S12 and the fuel temperature acquired in S16. Then, in S22, the controller 10 calculates a drive duty cycle, which is used when the pump 20 is driven, by adding the duty cycle correction value specified in S20 to the standard duty cycle specified in S18. For example, when the duty cycle correction value specified in S20 is 0%, the drive duty cycle is equal to the standard duty cycle specified in S18. The drive duty cycle becomes larger as the pressure of the fuel passage 22 between the pump 20 and the filter 24 becomes higher. The drive duty cycle becomes larger as the fuel temperature becomes lower.

Then, in S24, the controller 10 drives the inverter 50 using the drive duty cycle calculated in S22. The pump 20 is thereby supplied with electric power and thus starts to operate. Then, in S26, the controller 10 determines whether the position of the rotor of the pump 20 can be detected at the rotor position detection sensor 30 or not. In a configuration that detects the position of the rotor by using the induction voltage of the motor, electromotive force is small immediately after the motor starts to operate, and thus the induction voltage cannot be detected. Therefore, the position of the rotor cannot be detected. In S26, whether the pump 20 is operating or not is determined by determining whether the position of the rotor of the pump 20 can be detected or not. When receiving a signal indicative of the position of the rotor (i.e., induction voltage) from the rotor position detection sensor 30, the controller 10 determines that the position of the rotor can be detected. The controller 10 waits until the position of the rotor can be detected (NO in S26), while it proceeds to S28 when the position of the rotor can be detected (YES in S26).

In S28, the controller 10 determines whether the drive duty cycle calculated in S22 is larger than the standard duty cycle specified in S18. When the drive duty cycle is larger than the standard duty cycle (YES in S28), the controller 10 switches a high load flag stored in the controller 10 from OFF to ON in S30 and then ends the freeze avoidance process. The high load flag is reset to OFF when the engine is stopped. When the drive duty cycle is equal to the standard duty cycle (NO in S28), i.e., when the duty cycle correction value specified in S20 is 0%, S30 is skipped and then the freeze avoidance process ends.

When a duty cycle correction value larger than 0% is specified in S20 of the freeze avoidance process, the pump 20 is driven with a higher duty cycle than the standard duty cycle. Thus, the freeze avoidance control to reduce clogging of the filter 24 due to frozen diesel fuel is executed.

In the freeze avoidance control, the drive duty cycle of the pump 20 becomes larger as the pressure of the fuel passage 22 between the pump 20 and the filter 24 becomes higher, and the drive duty cycle of the pump 20 becomes larger as the fuel temperature becomes lower. As the drive duty cycle is larger, the voltage applied to the pump 20 is higher and the load on the pump 20 is higher. Further, as the pressure of the fuel passage 22 between the pump 20 and the filter 24 becomes higher, the probability that the filter 24 is clogged by the diesel fuel freezing is higher. Similarly, as the fuel temperature becomes lower, the probability that the filter 24 is clogged by the diesel fuel freezing is higher. That is, in the freeze avoidance process, the pressure of the fuel passage 22 between the pump 20 and the filter 24 and the fuel temperature are used as indexes that indicate the degree of clogging of the filter 24. According to the freeze avoidance process, the diesel fuel adhering to the filter 24 can be removed by increasing the load on the pump 20 when the degree of clogging of the filter 24 is presumed to be high. Thus, clogging of filter 24 can be reduced.

In the table 410, the duty cycle correction value of 0% is set for the range of fuel temperature equal to or larger than the threshold TZ0° C. Thus, the freeze avoidance control is not executed for the range of temperature equal to or larger than the threshold TZ0° C. In other words, the freeze avoidance control is executed when the temperature of the diesel fuel is lower than the threshold TZ0° C. Thus, it is possible to avoid the freeze avoidance control being executed when the diesel fuel is expected not to freeze.

(Pump Driving Process)

Figure 5:
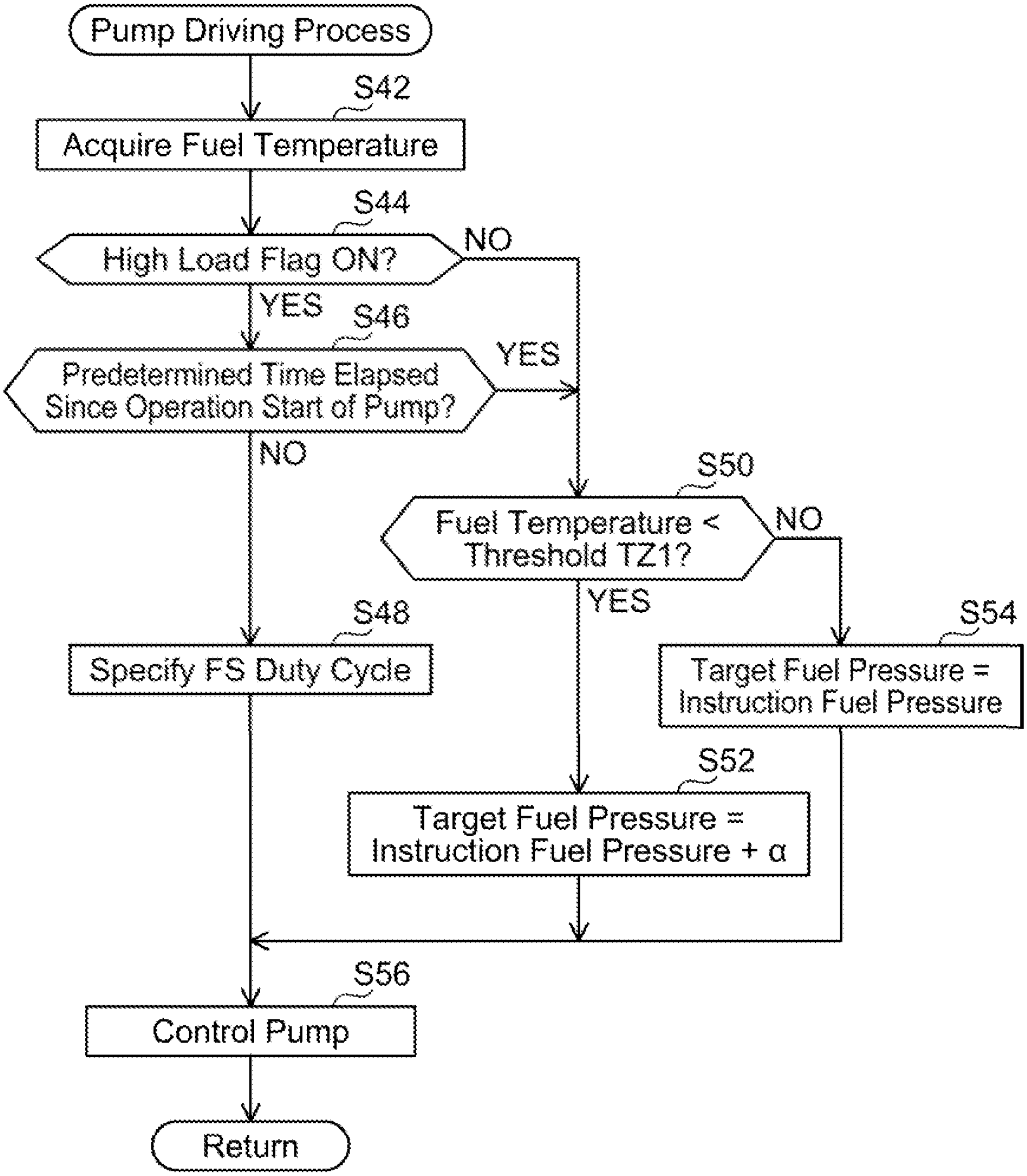
FIG. 5 illustrates a flowchart of a pump driving process according to the first embodiment.

Referring to FIG. 5, a pump driving process executed by the controller 10 is described. The pump driving process is executed when the ignition switch is switched to ON, i.e., when the diesel fuel is to be supplied to the engine by the pump 20 being driven. Thus, a period from the execution of the freeze avoidance process to the execution of the pump driving process varies. When receiving, from the ECU 200, a signal indicative of an instructed fuel pressure representing a discharge pressure of the pump 20 when it discharges the diesel fuel, the controller 10 executes the pump driving process. The pump driving process is repeatedly executed while the pump 20 is in operation.

In the pump driving process, the controller 10 firstly acquires a fuel temperature from the temperature sensor 44 in S42. Then, in S44, the controller 10 determines whether the high load flag is ON or not. The process proceeds to S46 when it is determined that the high load flag is ON (YES in S44), while the process proceeds to S50 when it is determined that the high load flag is not ON (NO in S44).

In S46, the controller 10 determines whether a predetermined period (e.g., several a seconds) has elapsed since the operation start of the pump 20, i.e., since the pump 20 was started in S24 of the freeze avoidance process. The process proceeds to S50 when it is determined that the predetermined period has elapsed since the pump 20 was started (YES in S46), while the process proceeds to S48 when it is determined that the predetermined period has not elapsed (NO in S46). The predetermined period of S46 may be a period required for the frozen diesel fuel to detach from the filter 24. The predetermined period of S46 is determined in advance through experiments, etc. and stored in the controller 10.

In S48, the controller 10 sets the drive duty cycle as a failsafe duty cycle (may be termed "FS duty cycle" hereinafter), and proceeds to S56. The failsafe duty cycle is a duty cycle for driving the pump 20 with a high load in order to avoid an event that the diesel fuel is not normally supplied from the pump 20 (i.e., failure) due to the freezing of the diesel fuel. The FS duty cycle is larger than a duty cycle usually used for fuel supply. The FS duty cycle may be, for example, 100%, or may be an allowable maximum duty cycle depending on performance of a device, such as the pump 20.

In S50, the controller 10 determines whether the fuel temperature acquired in S42 is lower than a threshold TZ1 or not. The threshold TZ1 is a temperature at which the diesel fuel can freeze (e.g., −10° C.). Alternatively, the threshold TZ1 may be higher or lower than the temperature at which the diesel fuel can freeze. When determining that the fuel temperature is lower than the threshold TZ1 (YES in S50), the controller 10 sets a target fuel pressure, which is a target pressure of the diesel fuel discharged from the pump 20, to a pressure that is larger by a kPa than an intended fuel pressure acquired from the ECU 200 in S52 and proceeds to S56. When determining to the contrary that the fuel temperature is not lower than the threshold TZ1 (NO in S50), the controller 10 sets in S54 the target pressure to the intended fuel pressure acquired from the ECU 200 and proceeds to S56.

In S56, the controller 10 controls the pump 20. Specifically, when the FS duty cycle is specified in S48, the controller 10 controls the pump 20 with the specified FS duty cycle in S56. To the contrary, when the target fuel pressure is specified in S52 or S54, the controller 10 acquires the current pressure of the diesel fuel from the pressure sensor 26 in S56, and then compares the acquired fuel pressure with the target fuel pressure. When the target fuel pressure is larger than the acquired fuel pressure, the controller 10 decreases the duty cycle by a predetermined value. When the target pressure is smaller than the acquired fuel pressure, the controller 10 increases the duty cycle by a predetermined value. Thus, the fuel pressure approaches the target fuel pressure by the pump driving process being repeatedly executed.

The pump driving process is executed after the freeze avoidance process. The situation where the high load flag is set ON in the freeze avoidance process is where it is expected that the filter 24 is being clogged. In this situation, the diesel fuel adhering to the filter 24 may not be removed completely even by the freeze avoidance control with the high load on the pump 20. Especially when a sufficient amount of time has not elapsed yet since the freeze avoidance control was executed, the frozen diesel fuel may not be melted yet, for example, even by heat generated by the engine. In such a situation, i.e., YES in S44 and NO in S46, the drive duty cycle is set to the FS duty cycle in S48 to make the load on the pump 20 higher than the normal load in the pump driving process, and thus the diesel fuel remaining on the filter 24 can be removed.

Even when the sufficient amount of time has elapsed since the freeze avoidance control was executed, the diesel fuel may freeze if its temperature is low. In such a situation, i.e., YES in S46 and S50, the target fuel pressure is set higher than the instructed fuel pressure in S52 to make the load on the pump 20 higher than the normal load in the pump driving process, and thus the diesel fuel can avoid freezing.

(Pump Stopping Process)

Figure 6:
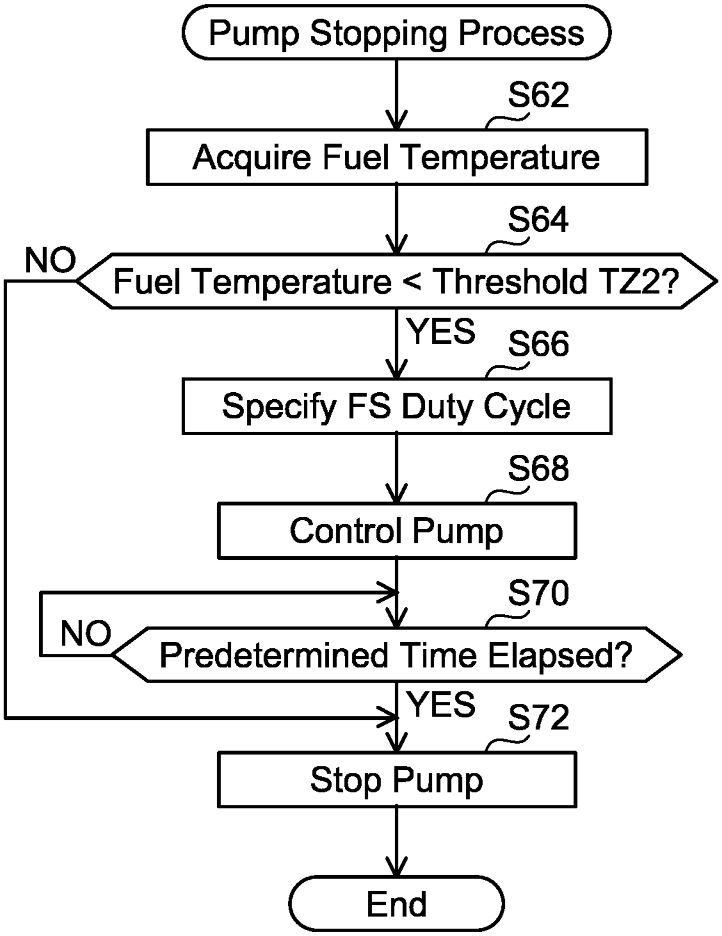
FIG. 6 illustrates a flowchart of a pump stopping process.

Referring to FIG. 6, a pump stopping process executed by the controller 10 is described. The pump stopping process is executed at a timing when the engine is stopped, for example, when the ignition switch is switched from ON to OFF, when the engine is suspended from idling, or the like. Specifically, the controller 10 executes the pump stopping process when receiving a stop request for stopping the pump 20 from the ECU 200.

In the pump stopping process, the controller 10 firstly acquires a fuel temperature from the temperature sensor 44 in S62. Then, in S64, the controller 10 determines whether the fuel temperature acquired in S62 is lower than a threshold TZ2 or not. As with the threshold TZ1, the thresholds TZ1, TZ2 are temperatures at which the diesel fuel is expected to freeze (e.g., −10° C.). Alternatively, the threshold TZ2 may be higher or lower than the temperature at which the diesel fuel is expected to freeze. The threshold TZ2 may be the same as or different from the threshold TZ1.

When the fuel temperature is not less than the threshold TZ2 (NO in S64), the process proceeds to S72. To the contrary, when the fuel temperature is less than the threshold TZ2 (YES in S64), the controller 10 specifies a FS duty cycle in S66 as in S48. Then in S68, the controller 10 controls the pump 20 with the FS duty cycle specified in S66. Then in S70, the controller 10 waits until a predetermined period elapses since it started to control the pump 20 in S68. The predetermined period of S70 is, for example, a period required to remove the frozen diesel fuel clogging in the filter 24. The predetermined period of S70 is determined, for example, by experiments.

When the predetermined period has elapsed in S70 (YES in S70), the process proceeds to S72. In S72, the controller 10 executes the pump stopping process by stopping the pump 20.

In a case where the fuel temperature is low when the pump 20 is to be stopped, the diesel fuel may freeze after the pump 20 is stopped. In the pump stopping process, in a case where the fuel temperature is low, the drive duty cycle is set to the FS duty cycle to increase the load on the pump 20 before the pump 20 is stopped, and thus the frozen diesel fuel can be removed from the filter. Thus, the clogging of the filter 24 can be suppressed after the pump 20 is stopped. As a result, when the engine is to be started next time, the clogging of the filter 24 due to the freezing can be reduced.

Second Embodiment

Figure 7:
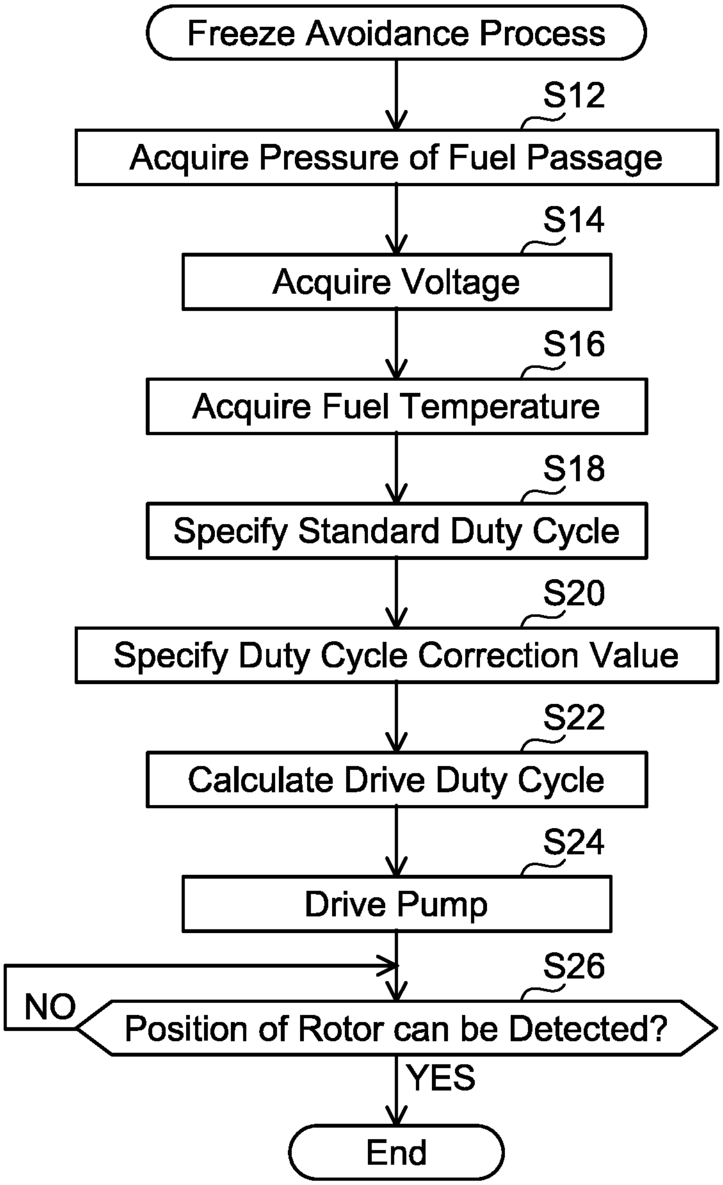
FIG. 7 illustrates a flowchart of a freeze avoidance process according to a second embodiment.

Differences from the first embodiment are described. In the present embodiment, a freeze avoidance process and a pump driving process are different from the freeze avoidance process and the pump driving process according to the first embodiment, respectively. As illustrated in FIG. 7, in the freeze avoidance process, steps S12 to S26 are executed and then the process ends. Unlike the first embodiment, steps S28 to S30 are not executed. The controller 10 may not store the high load flag.

Figure 8:
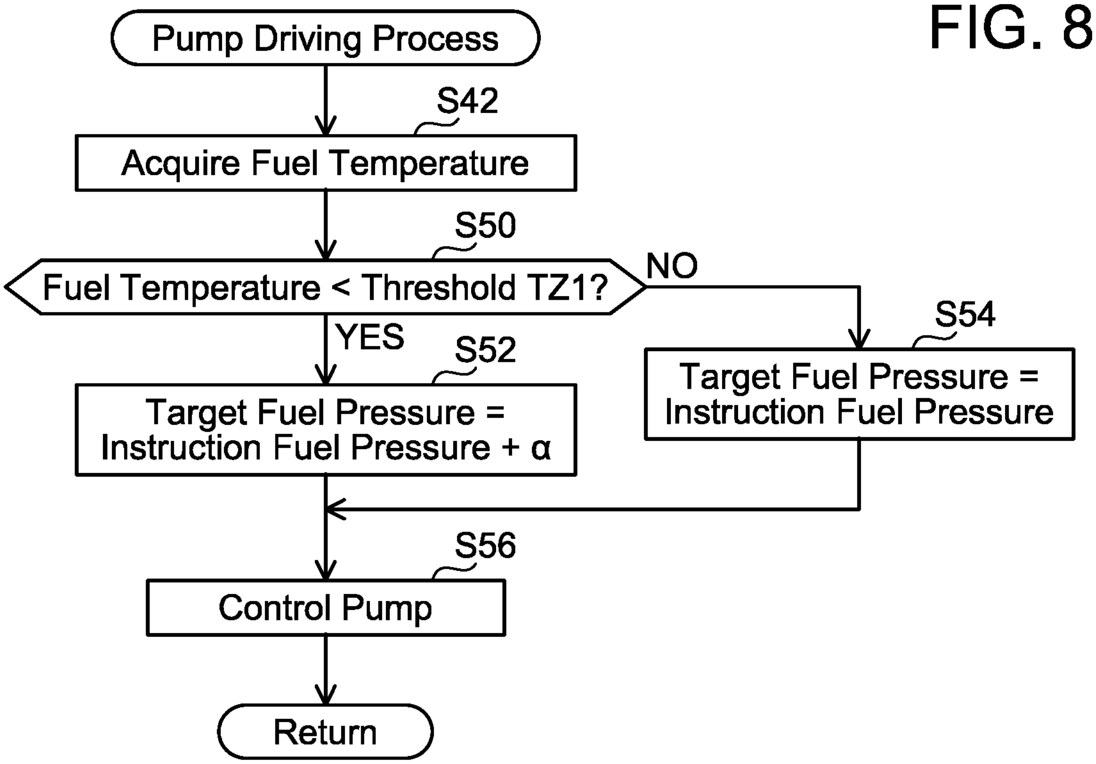
FIG. 8 illustrates a flowchart of a pump driving process according to the second embodiment.

As illustrated in FIG. 8, in the pump driving process, step S50 is executed after step S42. In case of YES in S50, step S52 is executed, while in case of NO in S50, step S54 is executed. After S52 or S54, the pump 20 is controlled in S56.

Third Embodiment

Differences from the first embodiment are described. In the present embodiment, a freeze avoidance process and a pump driving process are different from the freeze avoidance process and the pump driving process according to the first embodiment, respectively. The pump driving process according to the present embodiment is the same as the pump driving process according to the second embodiment.

Figure 9:
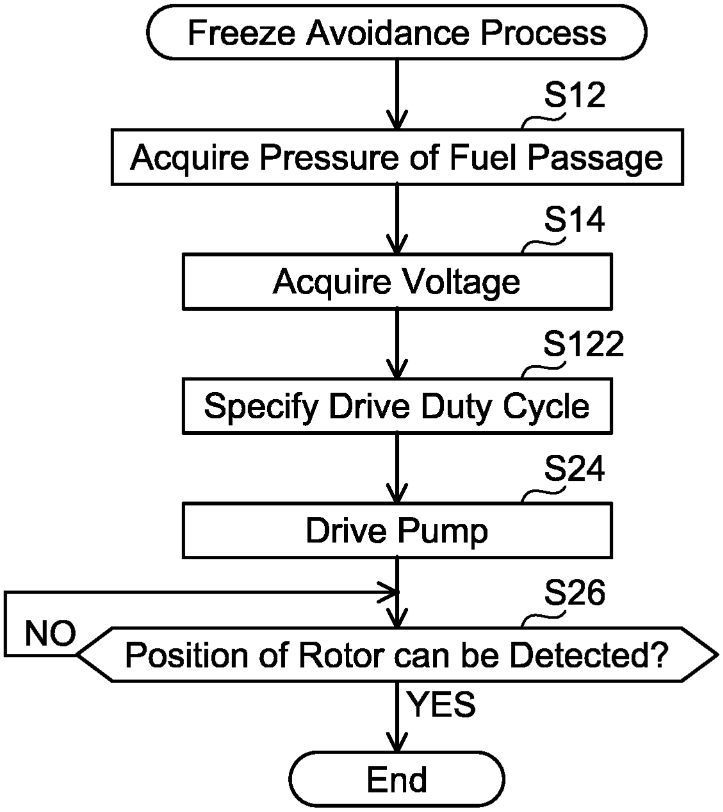
FIG. 9 illustrates a flowchart of a freeze avoidance process according to a third embodiment.

As illustrated in FIG. 9, in the freeze avoidance process, the controller 10 specifies a drive duty cycle in S122 using a table 500 illustrated in FIG. 10 after executing steps S12 to S14. The table 500 stores voltages of the battery 12, pressures of the fuel passage 22 between the pump 20 and the filter 24, and drive duty cycles in association with each other. The table 500 is determined based on experiments or simulations conducted by the manufacturer of the vehicle, etc. and is stored in advance in the controller 10. After steps S24 to S26 are executed, the freeze avoidance process ends.

While specific examples of the present disclosure have been described above in detail, these examples are merely illustrative and place no limitation on the scope of the patent claims. The technology described in the patent claims also encompasses various changes and modifications to the specific examples described above.

(Variants)

(1) Orders of the steps in the freeze avoidance process, the pump driving process, and the pump stopping process according to each of the embodiments described above are not limited to the orders described above regarding the embodiments. For example, in the freeze avoidance process according to the first embodiment illustrated in FIG. 2, steps S28 and S30 may be executed between step S20 and step 22. Alternatively, in the pump driving process according to the first embodiment illustrated in FIG. 5, step S42 may be executed in case of YES in S46.

(2) In each embodiment described above, the pressure of the fuel passage 22 between the pump 20 and the filter 24 and the fuel temperature are used as indexes indicating the degree of clogging of the filter 24. However, one of the pressure of the fuel passage 22 between the pump 20 and the filter 24 and the fuel temperature may be used as an index indicating the degree of clogging of the filter 24. In this case, the controller 10 may store a table in which larger drive duty cycles are associated with higher degrees of clogging of the filter 24 indicated by the index, i.e., higher pressures of the fuel passage 22 between the pump 20 and the filter 24 or lower fuel temperatures.

(3) In each embodiment described above, the pump driving process and the pump stopping process may not be executed. In this case, the controller 10 may determine a drive duty cycle such that a pressure of the fuel to be discharged from the pump 20 becomes the instructed fuel pressure when the pump 20 is to be driven. Alternatively, when the pump 20 is to be stopped, the controller 10 may stop the pump 20 immediately.

The technical elements explained in the present specification or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

REFERENCE SIGNS LIST

10: Controller
12: Battery
20: Pump
22: Fuel Passage
24: Filter
26: Pressure Sensor
30: Rotor Position Detection Sensor
40: Voltage Sensor
44: Temperature Sensor
50: Inverter
100: Pump Unit
200: Engine Control Unit
300: Fuel Tank

The invention claimed is:

1. A pump unit comprising:

a pump configured to increase a pressure of diesel fuel and discharge the diesel fuel to a fuel passage in which a filter is disposed;

a controller configured to control an operation of the pump; and a temperature acquirer configured to acquire a fuel temperature of the diesel fuel, wherein the controller is configured to execute freeze avoidance control in which the operation of the pump is controlled using an index that indicates a degree of clogging of the filter caused by the diesel fuel freezing, in the freeze avoidance control, the controller is configured to apply a higher load to the pump as the degree of clogging of the filter indicated by the index is higher, and in a case where the acquired fuel temperature is lower than a second threshold when a stop request for stopping the pump is received from outside while the pump is in operation, the controller is configured to stop the pump after allowing the pump to operate with an increased load for a predetermined period.

2. The pump unit as in claim 1, further comprising:

a pressure acquirer configured to acquire a pressure of the fuel passage between the pump and the filter, wherein the index includes the acquired pressure of the fuel passage, and the controller is configured to apply a higher load to the pump as the pressure of the fuel passage is higher.

3. The pump unit as in claim 1, wherein the controller is configured to apply a higher load to the pump when the pump is to discharge the diesel fuel before a first predetermined period elapses since the freeze avoidance control was executed than when the pump is to discharge the diesel fuel after the first predetermined period has elapsed since the freeze avoidance control was executed.

4. The pump unit as in claim 1, wherein the controller is configured to execute the freeze avoidance control when the acquired fuel temperature is lower than a first threshold.

5. The pump unit as in claim 1, wherein:

the index includes the acquired fuel temperature, and the controller is configured to apply a higher load to the pump as the fuel temperature is lower.

* * * * *